United States Patent
Bhagat

(10) Patent No.: US 11,210,341 B1
(45) Date of Patent: Dec. 28, 2021

(54) WEIGHTED BEHAVIORAL SIGNAL ASSOCIATION GRAPHING FOR SEARCH ENGINES

(71) Applicant: A9.com, Inc., Palo Alto, CA (US)

(72) Inventor: Rahul Bhagat, Issaquah, WA (US)

(73) Assignee: A9.com, Inc., Palo Alto, CA (US)

( * ) Notice: Subject to any disclaimer, the term of this patent is extended or adjusted under 35 U.S.C. 154(b) by 93 days.

(21) Appl. No.: 16/707,454

(22) Filed: Dec. 9, 2019

(51) Int. Cl.
*G06F 16/835* (2019.01)
*G06F 16/838* (2019.01)
*G06F 16/9536* (2019.01)
*G06F 16/903* (2019.01)

(52) U.S. Cl.
CPC ........ *G06F 16/8365* (2019.01); *G06F 16/838* (2019.01); *G06F 16/90348* (2019.01); *G06F 16/9536* (2019.01)

(58) Field of Classification Search
CPC .......... G06F 16/9535; G06F 16/24578; G06F 16/9038; G06F 16/8365; G06F 16/838; G06F 16/9536; G06F 16/90348

USPC .............. 707/723, 748; 705/14.51
See application file for complete search history.

(56) References Cited

U.S. PATENT DOCUMENTS

| | | | |
|---|---|---|---|
| 6,410,245 B1* | 6/2002 | Northrop | C07K 7/06 424/141.1 |
| 2007/0143307 A1* | 6/2007 | Bowers | G06F 16/972 |
| 2012/0084282 A1* | 4/2012 | Chiang | G06F 16/957 707/725 |
| 2019/0163869 A1* | 5/2019 | Nagarajan | G16H 10/20 |

* cited by examiner

*Primary Examiner* — Baoquoc N To
(74) *Attorney, Agent, or Firm* — Hogan Lovells US LLP

(57) ABSTRACT

Systems and methods are disclosed for optimizing responses to queries. Analyses of user interactions and other behaviors can lead to association of queries with signals, including ASINs and other product descriptions. The associations can be algorithmically graphed and analyzed on a disaggregated basis and individually weighted to improve search recall and reduce the risk of returning defective search results. Machine learning techniques can further optimize the associations and/or the search results.

20 Claims, 7 Drawing Sheets

US 11,210,341 B1

WEIGHTED BEHAVIORAL SIGNAL ASSOCIATION GRAPHING FOR SEARCH ENGINES

BACKGROUND

Users are increasingly utilizing electronic devices to research, locate, and obtain various types of information, with the primary goal of information retrieval via general internet ("web"), or other, search engines being to efficiently retrieve relevant information. For example, a user may employ a search engine to locate information about various items available for purchase through an online store. Yet the proliferation of information, products, and services, available or at least referenced online, has made it difficult and time-consuming to locate the sought information and offerings.

Current search paradigms may return a set of relevant documents or "hits," given a user query. For example, a store can easily serve a querying customer seeking "running shoes" in a situation where the store's database includes product title entries including "running shoes." Of course, a different customer seeking the same type of product might query "jogging shoes" at the store, but the term "jogging" is not in the product title or description, leading to a defective search result. Thus, there arises a need to improve search results, via better recall and result ranking, with decreased defective entries included in the results.

BRIEF DESCRIPTION OF THE DRAWINGS

Various embodiments in accordance with the present disclosure will be described with reference to the drawings, in which.

DETAILED DESCRIPTION

Figure 1:
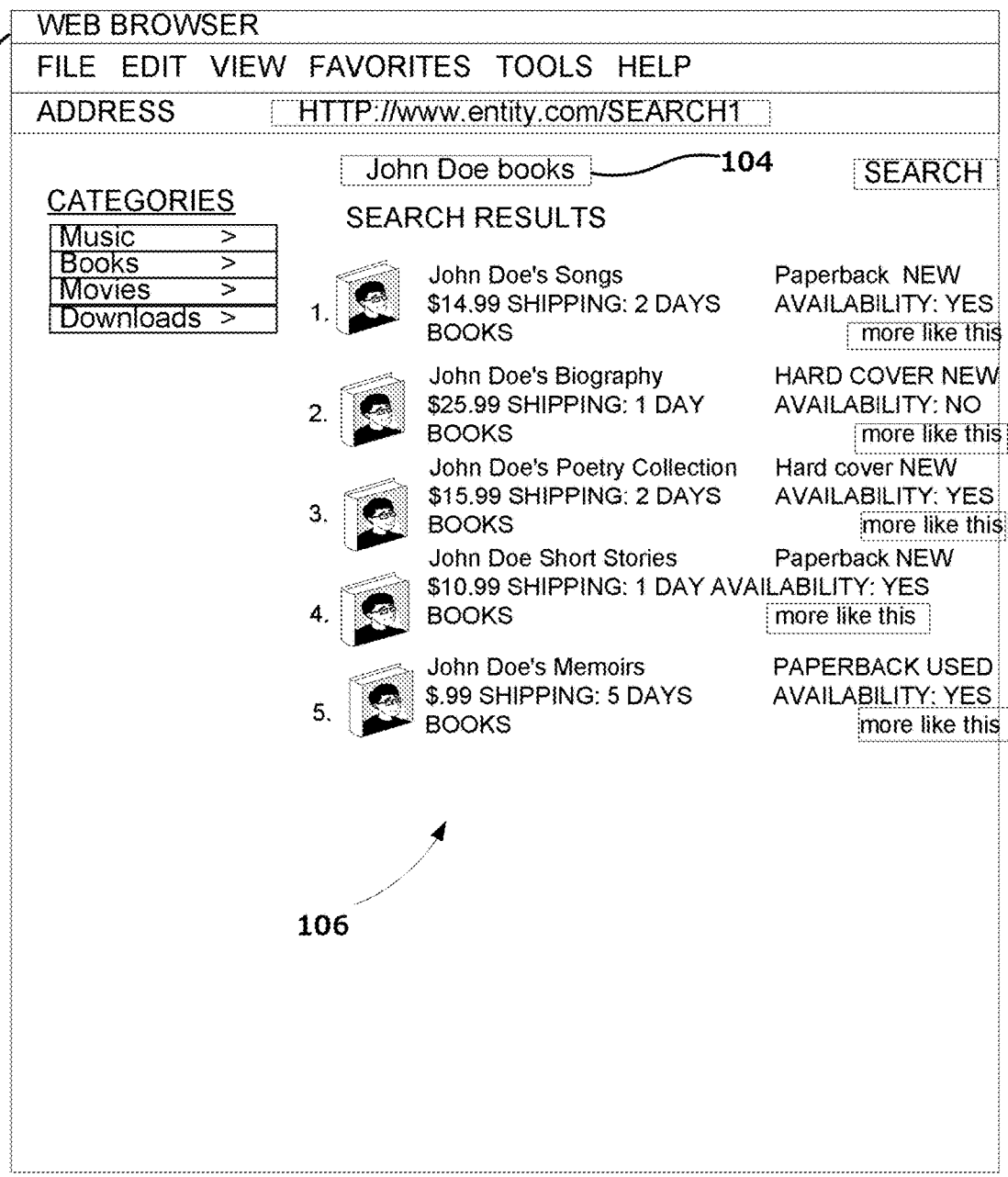
FIG. 1 illustrates an example display of search results that can be presented in accordance with various embodiments of this disclosure.

In the following description, various illustrative embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Systems and methods in accordance with various embodiments of the present disclosure may overcome one or more of the aforementioned and other deficiencies experienced in conventional approaches to searching and otherwise exploring for content. The concepts herein allow finding desired information in even large collections of documents. Search service providers can provide search access to any sort of content, including e-commerce store offerings, question and answer websites, data broker websites, social networks, message boards, forums, blog or personal websites, directory websites, online community websites, and knowledge-base/wiki websites, among other such websites.

Online or e-commerce stores, in particular, may provide for unique identifiers for items or services which are offered for perusal, sale, lease, rental, and the like. The unique identifier may be a title, a description, a phrase, or some other content associated with a specific item. Accordingly, the unique identifiers assigned to an item may help the store classify the item into categories or associate the item with related items, which can prove useful in responding to queries by prospective customers. Products and services sold in an e-commerce store will each have at least one "signal" or piece of useful information, such as product descriptions and/or titles, with some such signals being provided to the store provider by third-party merchants/ suppliers. By way of one example, a representative item associated with a unique identifier may be a motion picture stored on an optical disc, such as a digital versatile disc ("DVD"). In addition, millions of consumers engage in online shopping activity every day though clicking hyperlinks and purchases, generating one or more additional "signals" of import when a store desires to improve search results, recommendations, and the like. Very rich data sets thus arise for potential use by online retailers and other entities which often address received queries.

As an initial matter, it should be well-noted that the searched content need not be limited to that in stores—any content repository may provide for an application setting—but terms such as "store" and "e-commerce store" are employed frequently herein merely for convenience. Further, the content may be the subject of searches for any sort of information, including that pertaining to services, not just products. Accordingly, subjects of searches, for possible presentation as query results, may be a downloadable movie file or an electronic book ("e-book") that can be downloaded to an electronic reader device.

FIG. 1 illustrates an example display 100 of content on a display screen 102 of a computing device in accordance with various embodiments. In this example, a search query 104 has been received, and a set of search results 106 was determined and returned for presentation in response to the request. As in known in the art, the interface may be a window, a website, an application screen of a web browser, or a stand-alone application, among other options, for interacting with the display content and for executing dynamic scripts within the interface. When submitted, the search may be initiated and processed on the computing device and/or on one or more servers as discussed in this disclosure. Alternatively, a search field may be dynamic and respond with search results 106 as letters are entered in a search box.

The search results 106 are fetched based per the search paradigm herein. Conventional methods for presenting results in response to a query are well known and, as such, will not be discussed herein in detail. In this example, resembling an e-commerce website, the user has submitted a query 104 consisting of the phrase "John Doe books" and the returned search results 106 have been determined to be relevant in exploratory ways discussed herein. The user can scroll, or otherwise navigate, through the results to determine whether any of the results are of interest. It might be the case that too many results 106 were returned, and the user is not finding items of interest in an initial subset of the results. Accordingly, the user might want to narrow the query 104 in order to obtain search results 106 that are more relevant or of interest to the user. For the avoidance of doubt, all illustrations herein (including screen displays) are merely representative, and search features and results may be presented in any number of ways, regions, or areas, while sponsored and other content may be displayed in other available sides, regions, or areas.

While textual-type searches are oft-discussed herein, such is also only for convenience, and the present disclosure entails, and can be applied to, all sorts of document, information, data, and media searches, including those which are audio-based or image-oriented. Hence, the terms "search," "query," "dataset," and "document" are intentionally non-limiting and to be interpreted broadly. Indeed, systems and methods could identify associations and relationships in images, video (including "vlogs"), audio, and the like. For example, in an audio-based or image-based searching process, steps and components described herein can be used, as might be applicable. For a received audio or image-based query, semantically-similar or the same audio or images are associated and utilized in delivering search results. A query could even be submitted in a more "long form" approach, such as via a user conversation with chat "bot" software and can be full or incomplete sentences (the response needs only a modicum of information in the corresponding query to apply the appropriate associations).

In general, the present disclosure improves search results, via better recall and result ranking, through architectures and techniques determining and applying associations between items and their unique identifiers and any number of behavioral signals. The behavioral signals involve user behavior and its association with unique identifiers such as, by way of but one example, metadata in the form of the Amazon Standard Identification Number ("ASIN"). An ASIN is a ten-character alphanumeric unique identifier assigned by Amazon.com and its partners for product identification within the Amazon organization. Of course, the searched content need not be ASIN-tied and can be any collection of uniquely-identified intangible or tangible products or services, or a bundle of same.

The behavioral signals may come in any number of forms, but, in some illustrative embodiments, can include online action such as simple user clicks on a hyperlinked item, a consumer adding an item to his or her online "shopping cart," and purchases. As will be seen, in contrast to dealing with these signals collectively and in the aggregate, analyzing and weighting the signals separately allows for the ability to fine-tune individual thresholds in models for each of the signals and serves to increase the coverage of query-item associations. This, in turn, enables the return of more relevant matches and increases recall of match sets for search results. In addition, matches from each of the signal-specific associations can serve as separate ranking signals, and that will allow ranking models to learn weights for each of these signals (as opposed to mere predetermined or ad hoc weights).

After disaggregating or desegregating the signals in various embodiments, two features, among others, may be employed in response to a received search result: generating a result set, and ranking the result set. As disclosed herein, this paradigm yields improved search results, in terms of increased recall of the match set and improved rankings, and also reduces the risk of defective results in a search result listing. In an example case, a customer may very well search for, and not "hit," a particular ASIN item by providing a non-matching product description (e.g., seeking "running shoes" but submitting a query for "jogging shoes"). Through query associations with ASINs established through the present systems and methods, it can be determined that the desired item is a pair of running shoes, even when the received query language recites "jogging shoes."

The systems and methods herein can analyze both a complete, natural language query and/or any word, phrase, or other segment therein, as well as metadata received with the query. Various illustrative embodiments provide techniques to assist in this regard, through the association of signals in connection with user queries/searches, to which items or other search offerings are associated (such association or a similar association of features is frequently referred to herein as "phrase-doc" simply for convenience). More particularly, in some embodiments, phrase-doc is a high-confidence query-ASIN association graph between queries and ASINs built by using various behavioral signals. This phrase-doc approach is used to increase the recall of match set and also assist in ranking; in doing so, it can determine both relatedness and a score for weighting.

Existing association models aggregate user purchases, add-to-cart actions, user clicks, and other user consumptions, all of which are stored in a search engine and used to build an initial query-ASIN graph which is then used to compute a final phrase-doc. Such a model merely gives pre-determined, ad hoc additional weights to some signals (e.g., purchase) to account for the fact that they are more important than others (e.g., clicks). Yet, via these previous models, the clicks, purchases, and the like are not broken down or otherwise separately identified using a phrase-doc approach. Only one computational job is performed there, with the existing techniques only capable of determining a single weight or score. As concrete examples of prior practice, a "customers who bought also bought" feature, on an e-commerce website's detail page for a given product, is computed simply using the customer-ASIN purchase signals, while a "customers who viewed also viewed" feature on the same detail page is computed using only the customer-ASIN clicks signal. Defective associations and search results thus can arise, including those due to random or errant associations (say, running shoes are sought by a user, but running socks are mistakenly presented in search results based on a click-to ASIN signal, or the prior methods might very well yield a television stand in query results when a television is what is sought by the user).

On the other hand, the presently-disclosed approach can, among other features, map a query-ASIN graph. Algorithms used for associating an ASIN to an ASIN can be used to perform the association of an ASIN with a query, using customer and other user behavioral signals, including those discussed herein. Again, any sort of unique identifier may be used as a signal in addition to, or lieu of, ASIN metadata, including, but not limited to, clicks on a hyperlinked web page entry and/or the addition of an item to an electronic shopping "cart." Instead of computing a single phrase-doc, computational association jobs can execute for each of any number of behavioral signals and for each ASIN, including the following merely representative examples: determining a "purchases" phrase-doc a "clicks" phrase-doc; an "add-to-cart" phrase-doc; an "add-to-wish list" phrase-doc; and a "consumption" phrase-doc (including consideration of whether or not one is a preferred/subscribed customer, as well as product returns and reorders). A further computation could determine a "source-of-the-query input" phrase-doc, which would analyze and associate queries based on the type of input device (be it a smart speaker, a mobile device, a desktop computer, or another device). As noted, the present systems and methods may be configured to receive queries delivered orally, by human or machine speech. In the case of a voice query, the particulars of a source of the spoken query can even serve as a "signal" (e.g., how it is phrased via choice of words and inflection). Moreover, a voice query will include useful, pre-labeled information and metadata, including that indicating whether the query is a shopping excursion and brand names of interest.

Figure 2A:
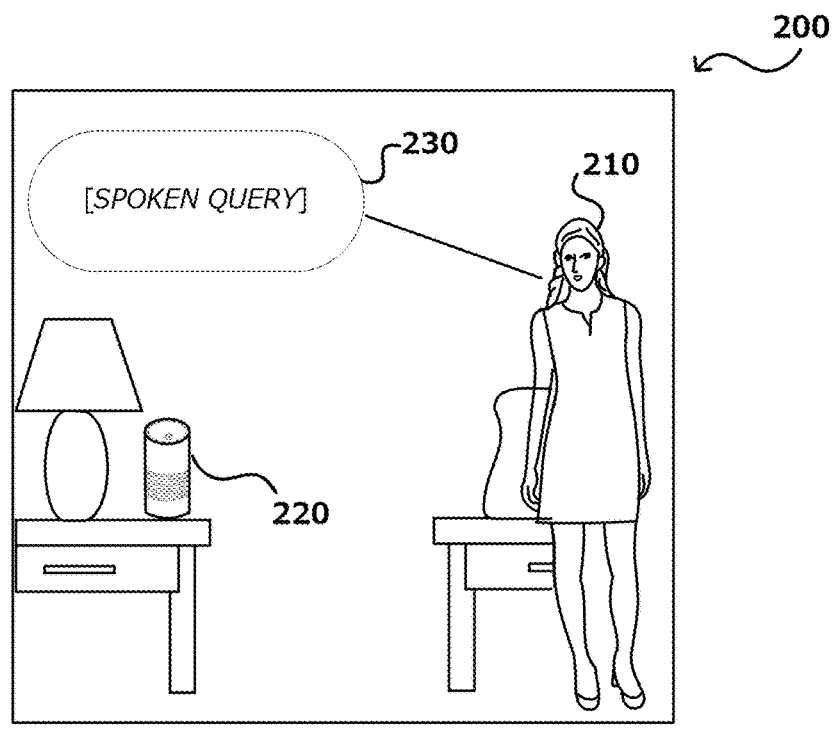
FIGS. 2A and 2B illustrate an example environment, and example search interactions between a user and a voice communications device, in which aspects of various embodiments of this disclosure can be utilized.

FIG. 2A illustrates an environment 200 for receiving, and responding to, a voice or orally-submitted query. In this example, the user 210 can utter a search request within the environment 200 where the voice communications device 220 is located. The request may be any question, inquiry, instruction, phrase, or other set of one or more words/sounds. For example, the user 210 may say, "Alexa, what types of retailers sell mattresses?" In this example, the word "Alexa" has a special connotation, in that it serves as a wakeword or activation word (the wakeword would be a different word, a particular phoneme, or a particular sound, such as the sound made by clapping or snapping your fingers). In particular, a wakeword may be detected within audio input data detected by one or more microphones located on the voice communications device 220. Persons of ordinary skill in the art will recognize, however, that the one or more microphones may alternatively be located on a separate device in communication with the voice communications device 220. In some embodiments, after the wakeword is detected, the voice communications device 220 may begin interpreting and analyzing audio input data until no more speech is detected.

Figure 2B:
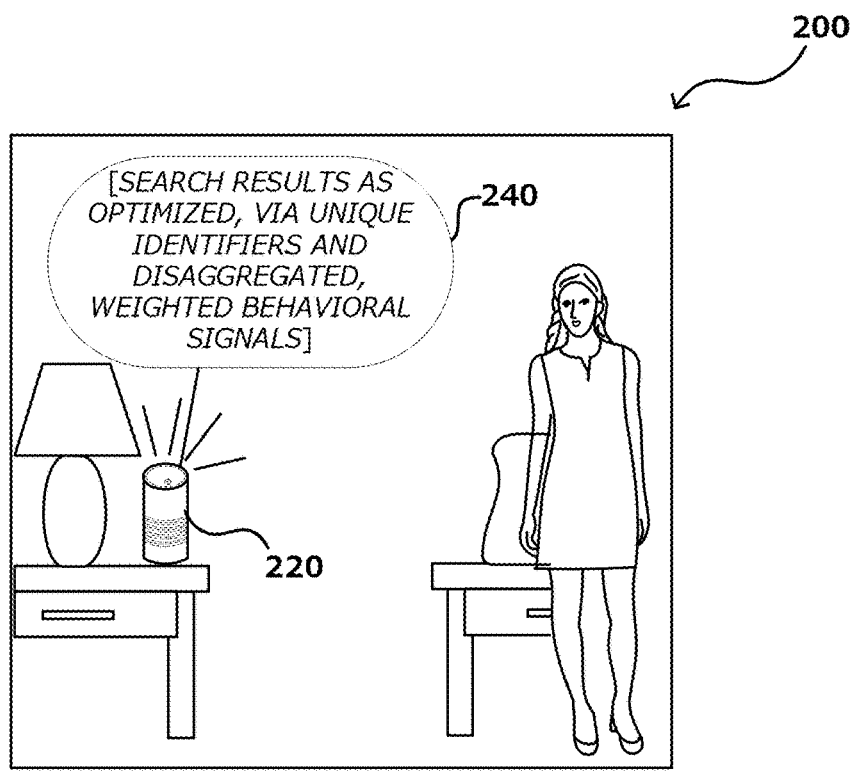

An application executing on the voice communications device 220, or otherwise in communication with the voice communications device 220, can analyze the user's speech that includes audio input query data 230 to perform at least one function. The functions can include, for example, performing a search for content in response to the user's search query 230. As indicated in FIG. 2B, in some embodiments, the search results 240 may be read back to the user 210 by the voice communications device 220 or may be transmitted to a registered computing device (not shown) associated with the user 210. In the interest of further optimizing search results, the voice communications device 220 can be associated with a user 210 customer account provided by a search service provider. The customer account can include one or more profiles, e.g., one or more family member profiles or other profiles, where each profile can be associated with a telephone/texting (SMS) number, preferences, access rights, and other information, and may share certain account settings such as payment information (e.g., credit or debit card), address, message allotment, etc. The user 210 announcing his or her identity can signal to the device 220 that the appropriate member profile and corresponding preferences, access rights, etc. should be loaded. In various embodiments, rather than have a user 210 announce an identity, the voice communications device 220 can automatically determine speaker identity using speech analysis software, resulting in the appropriate profile and corresponding preferences, access rights, etc. being used.

Regardless of the type of search setting, the various behavioral signals applied herein are stored inside, or otherwise in electronic connection with, a search engine and can be weighted. Any number of signals may be combined, stored, and weighted on the backend of the search engine environment. The phrase-doc approach can be utilized in many situations and applications, with item matching and ranking being two uses of note. And other algorithms as desired can be applied on top of those directed to such behavior storage, association, and weighing. In the example of item matching, should a customer search an e-commerce store for a certain product, such as jogging shoes, the present systems and methods can determine all ASINs associated with the term "jogging shoes." That association can be determined using not only product data and/or search query data provided by buyers, but also phrase-doc as a component or by itself. Another example is a ranking/ordering mode or model. The associations can then be used as a signal, and weighted rankings determined on top of that to determine the best or featured offerings. In computing similarities, be they for items (ASINs) or otherwise, various recommendation schemes can be applied, including "collaborative grouping" as a strategy. The determined similar results can be assigned weights, for purposes including establishing an order for the presentation of query results. The weighting considerations may factor in how a match is made, such as whether it was via phrase-doc or not. Further weighted-signal associations are certainly possible. It is likewise possible to associate queries with applications, such as an alarm app on a smartphone, to facilitate users' ease of setting, and turning off, the alarm.

In some illustrative embodiments, label propagation is used to compute the phrase-doc association with received user queries. The propagation of ASINs, or any other unique identifiers, to the queries may occur through algorithms for information perusal and association known to those in the computing art, including a random walk algorithm. These associations of unique identifiers and phrase-docs may provide correlations between items, in which the various association data generated by analyses herein may be used to provide the search results as well as item recommendations. For example, when a user inputs a search query for a particular item into a search engine of an online merchant, the search engine may provide an item that matches the search query, as well as one or more items that have traits or features similar to the matching item. The association data determined herein can enable an online merchant to customize the distribution of item search results or item recommendations for customers. In this way, customers may benefit by discovering items that are suited to their individual tastes and needs. The merchant may benefit by receiving recurring business from repeat customers or additional business from new customers. Phrase-doc, though, is but one method of associating features to queries, and the task can be accomplished by any number of schema, such as that based on an author-name concept.

The considerable benefits of machine learning, as discussed herein and including deep or hierarchical learning techniques known in the art, are applied in some embodiments for item and signal matching. Such techniques will prove particularly useful when attempting to find multiple associations both between queries and ASINs and associations between ASINs.

As indicated, the present systems and methods allow for ranking techniques to further optimize query results. Here, instead of creating a single score, tag, or label for weighting, multiple attributes are created, which allow any algorithms (including those machine-learned) to determine better discrete annotations of data set phrases and the like. A ranking/recall modeling can apply one or more algorithms, confidence points, etc. to overcome and "correct" a relatively strong click signal and a corresponding result determined. It is entirely possible to use a separate defect ranking model with its own weights for each of the signals. Through these fine-tuned, separate and weighted associations, the search results returned are more likely to be free of defects (i.e., items not of interest). Thus, an online vendor or other information holder can avoid, or at least minimize, the presentation of defective results in response to a received search query with the aid of ranking.

Behavioral associations between searchable items and search queries may be accumulated and stored in a behavior-based keyword data store (a behavioral association data store) and utilized for the purposes of search optimization techniques described herein. In one illustrative embodiment, a user conducting a search for an item may submit one or more search terms comprising a query to a search engine. The search engine returns search results of items associated with the submitted search term (or terms), and may have one or more search queries behaviorally associated with the item (in one embodiment, with the item's unique identifier). The search queries may be generated and stored in a behavioral association data store and retrieved from the data store as needed. Thus, each search query may be associated with an item of the search results via a behavioral association described above. Some queries may have a stronger association with an item than others.

In some embodiments, a ranking paradigm uses the presence or absence of phrase-doc matches as a signal when weighting. The potential features for ranking, though, are not limited by design and include evaluations for the present of matches such as the following: ASIN-query phrase-doc matches; click phrase-doc matches; purchase phrase-doc matches; and add-to-cart phrase-doc matches. A ranking or recall model will assign, via algorithms in illustrative embodiments, different weights to each of these features. As but one example, a purchase phrase-doc match can be deemed considerably more important that a click phrase-doc match, even as much as ten times so, and clicks may be weighted five times as important as mere clicks on an entry in a store or other site or database. As may be desired, some ranking algorithms' rules can be strict by design and/or application, and only focus on clicks and associations, views and associations, or add-to-cart and associations. Purchase-based algorithms may apply rules which are less strict given the strength of the purchase signal. As with other aspects of the present disclosure, the ranking algorithms can be machine learning-based.

Figure 3:
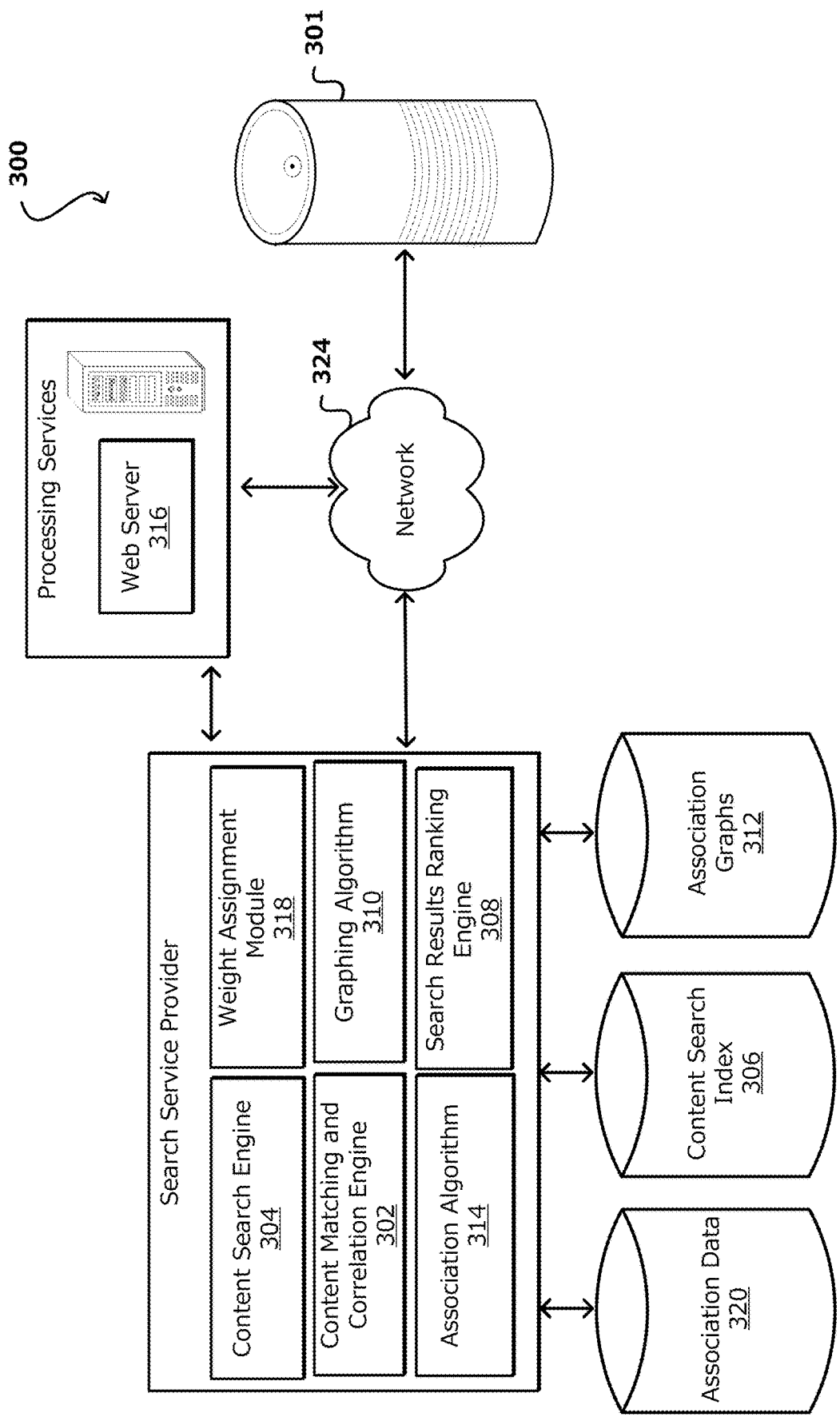
FIG. 3 illustrates an exemplary architecture for performing the various embodiments in accordance with aspects of this disclosure.
Figure 4:
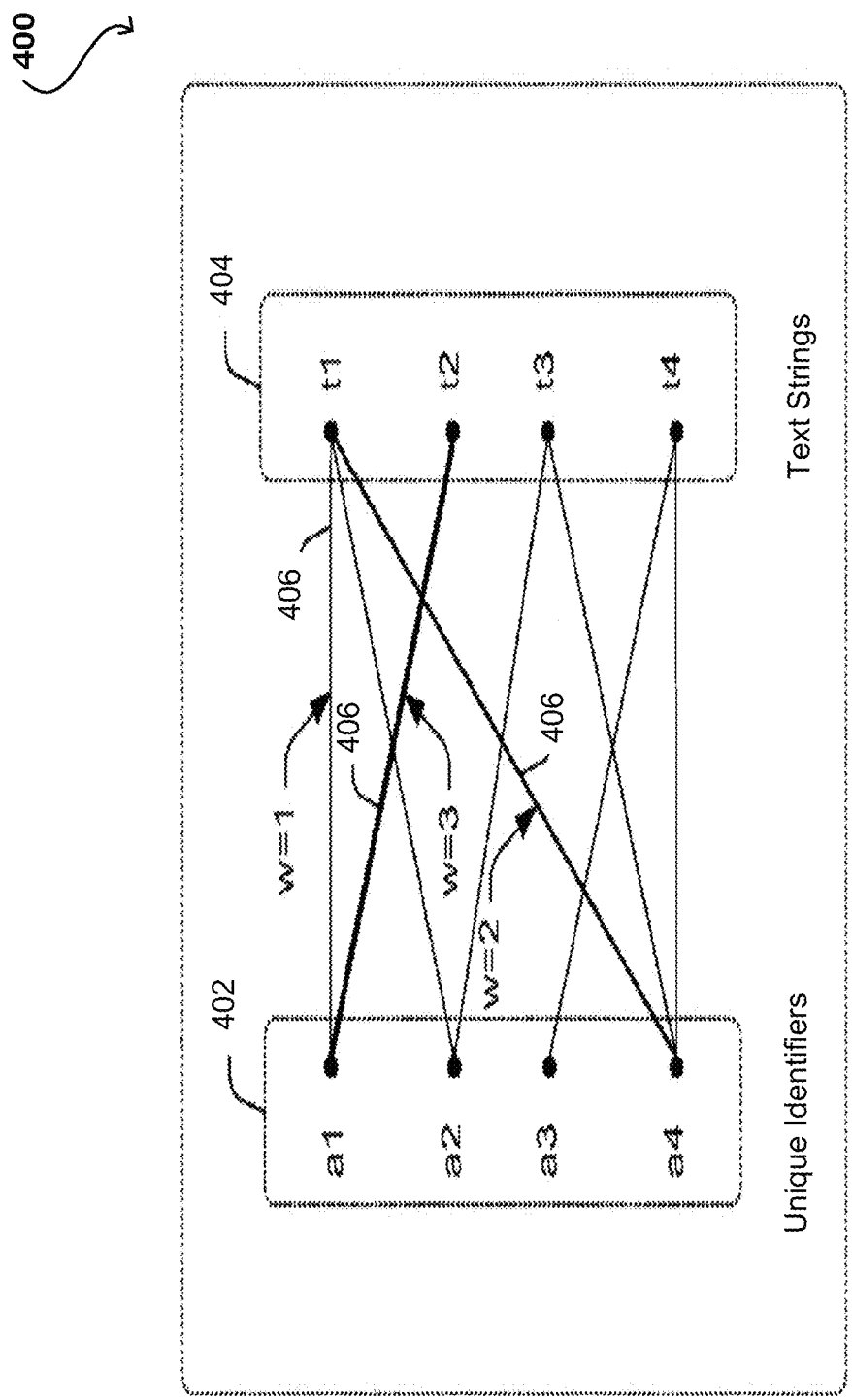
FIG. 4 illustrates an example association graph, in accordance with various embodiments of this disclosure.

FIG. 3 is a schematic diagram of an illustrative architecture 300 for implementing various representative embodiments disclosed herein for responding to a search query received from a client computing device 301. The architecture 300 can include a correlation engine 302, a search engine 304, a search index 306 for holding the phrase-doc associations, and a ranking engine 308. The correlation engine 302 may use a graphing algorithm 310 to generate association graphs 312 for analysis by one or more association algorithms 314, such as a random walk algorithm. In some illustrative embodiments, the association algorithm 314 may be a label propagation algorithm. For analysis to discover associations between unique identifiers and phrase-docs, the correlation engine 302 may generate a graph 312, such as the bipartite one 400 depicted in FIG. 4, based on the item unique identifiers 402 and the phrase-docs 404. The graph 400 may be a mathematical representation of the relationships between the unique identifiers 402 and the phrase-docs 404. As discussed herein, each of the phrase-docs 404 may be a feature or attribute connected to one or more items. A web server 316 handles processing and computing tasks in some embodiments, while another web server 316 can handle search indexing. Server and other computing resources may be dedicated, in entirety or in part, to the use of machine learning, including features discussed herein and layered deep learning, for query associations via the behavioral signals.

The generated graph 400 may include two sets of nodes, in which each of the unique identifiers 402 is represented by an item node (a) and each of the associated phrase-docs 404 is represented by a tagged association node (t). The edge 406 may be a representation of the relationship between the item node and the association tag. Accordingly, the graph 400 may include multiple edges 406 which link the nodes in the two sets, being unique identifiers 402 and phrase-docs 404. The correlation engine 302 may execute one or more associative algorithms 316 on the graph 400 to discover associations with respect to the unique identifiers 402 and the phrase-docs 404. Generally speaking, the associative algorithms 314, which may be multiple algorithms and can be a label propagation algorithm, is a semi-supervised or unsupervised learning method for finding associations between labeled data based on similarities between unlabeled data.

Execution of algorithms may further provide a ranking that can be applied when the systems and methods deliver search results in response to a query. As part of the ranking capabilities, the ranking engine 308 may further include a weight assignment module 318. In some embodiments, the weight assignment module 318 may assign weights to each of the edges in the graph 400. By way of potential weighting paradigms, for example, assuming that w represents weight, edge weighting may be as follows: $w_1$="2" for the edge assignments belonging in a top range of occurrence frequencies (e.g., 20%), $w_2$="3" for the edge assignments belonging in a middle range of occurrence frequencies (e.g., 60%), and $w_3$="1" for the edges assignments belonging to a bottom range of occurrence frequencies (e.g., 20%). Of course, in other examples, other weighing value combinations may be used for $w_1$, $w_2$, and $w_3$, such as {$w_1$="1", $w_2$="3", and $w_3$="2"} or {$w_1$="2", $w_2$="3", and $w_3$="2"}.

Analysis of the graph 400 using the association algorithm 314 will generate association data 320. The correlation engine 302 may feed the association data 320 to the search engine 304 and the ranking engine 308. The search engine 304 and the ranking engine 308 may use the association data 320 to produce rankings of items for inclusion in search results in response to a received query. The search engine 304 may then provide the search results to a requesting user, be it an individual or an automated entity configured to generate one or more queries. For example, when a search query seeking a particular item is entered into the search engine 304, the search engine 304 may provide an item that best matches the search query, as well as one or more other items determined to be relevant. The ranking engine 308 may further use association data 320 to generate recommendations simply for separate viewing on, say, a website or page. In an example, the ranking engine 308 may provide personalized recommendations, including in the form of a customized web page displayed to a customer.

These various engines and modules may be executed by one or more computing devices, including those having components and features mentioned in the present disclosure. In at least some embodiments, the computing devices may be servers. In other embodiments, each of the computing devices may be a smartphone or other mobile communications device, a tablet or other portable computer, a desktop computer, or any other electronic device equipped with network communication components to receive and transmit data, data processing components to process data, and user interface components to receive data from and present data to a user. The computing devices may include processor(s) and memory along the lines of that illustrated herein. The computing devices may also implement a data store which holds various data, and sets thereof, by the correlation engine 302. The data store may store data that are used by correlation engine 302, the search engine 304, and the ranking engine 308. Each set of data may be stored via a data table, a data array, and/or other data storage structures known to those in the art. In accordance with various embodiments, the data store can be populated with data sets in a number of ways. A document can be a JavaScript Object Notation ("JSON") document or other data structure format, such as XML. Modules utilized by the various systems and methods hereunder may include routines, programs, instructions, objects, and/or data structures that perform particular tasks or implement particular abstract data types.

With regard to certain specifics of system 300 architectures for performing the disclosed embodiments, they can include components and features familiar to those in the art, such as one more or content servers for serving content (including all or a portion of a user computing device's interface) in response to a search and one or more databases for storing content from content providers (e.g., product information, service information, advertisements, news, social media, and other content from which information is gleaned for use in the present systems and methods). A network 324 can connect the various system 300 components, and it can be, for example, one or more local-area networks ("LAN") and/or wide-area networks ("WAN"). The network 324 can be in the form of any appropriate network, including an intranet, the internet, a cellular network, or any other such network or combination thereof. The network 324 could be a "push" network, a "pull" network, or a combination thereof. In a "push" network, one or more of the servers push out data to querying client devices, while, in a "pull" network, one or more of the servers send data to client devices upon request. Protocols and components for communicating via electronic networks are well-known and will not be discussed herein in detail, although it is worth noting that communication over the network 324 can be enabled via wired or wireless connections and combinations thereof.

Search service providers can provide requested content (e.g., query results) over the network 324, such as by one or more content servers operating as a host for interacting with users' computing devices. In one implementation, the content server hosts its own service, such as an e-commerce store. Content servers may provide hyperlinks for content of various products and/or services found in the delivered search results. Further, a content server may be a special status host and may have special access ability to stored content and indices, allowing at least a portion of content and indices to be dynamically updated for providing new information to interested parties in future searches. The content servers may employ firewalls, cookies, authentication certificates, signed certificates, and/or any other security techniques to enable and prevent access to protected content.

Search service provider devices can include any processor and memory-based electronic devices with capabilities as disclosed herein, but at least with the capability to execute computer-readable instructions in a browser or to execute computer-readable instructions with or without a browser. These electronic devices include those described herein and may have specific configurations to perform the functions herein. Such electronic devices may include personal desktop computers, laptops, tablets, smartphones, wearable devices, handheld messaging devices, set-top boxes, personal data assistants, electronic book readers, and the like. Each of these electronics devices may be configured to include a browser or a stand-alone application capable of being configured in the manners of this disclosure.

Example environments discussed herein for implementing aspects in accordance with various embodiments are primarily internet or web-based, as relate to internet services and cloud computing, but it should be appreciated that, although a web-based environment is used for purposes of explanation, different environments may be used, as appropriate, to implement various embodiments. For the avoidance of doubt, client devices used to interact with various embodiments can include virtually any appropriate device operable to send and receive requests, messages, or information over an appropriate network and convey information back to a user of the device. It should be understood that there can be several application servers, layers, or other elements, processes, or components, which may be chained or otherwise configured, which can interact to perform tasks as discussed and suggested herein. As used herein, the terms "database" and "data store" refer to any device or combination of devices capable of storing, accessing, and retrieving data, which may include any combination and number of data servers, databases, datasets, data storage devices, and data storage media, in any standard, distributed, or clustered environment. The application server can include any appropriate hardware and software for integrating with databases and data stores as needed to execute aspects of one or more applications for the client device, handling a majority of the data access and business logic for an application. The application server provides access control services in cooperation with data stores, and is able to generate content such as text, graphics, audio, and/or video, which may be served to the user by the web server in the form of HTML, XML, or another appropriate structured language in this example. The handling of all requests and responses, as well as the delivery of content between a client device and a resource, can be handled by the web server. It should be understood that the web and application servers are not required and are merely example components, as structured code discussed and contemplated herein can be executed on any appropriate device or host machine as discussed elsewhere herein. Each server will include an operating system ("OS") that provides executable program instructions for the general administration and operation of that server, and will include a non-transitory computer-readable medium storing instructions that, when executed by a processor of the server, allow the server to perform its intended functions. Suitable implementations for the OS and functionality of the servers are known or commercially available, and are readily implemented by persons having ordinary skill in the art, particularly in light of the disclosure herein.

The environment in some embodiments is a distributed or "cloud" computing environment utilizing several computer systems and components that are interconnected via communication links, using one or more computer networks or direct connections. Most embodiments utilize at least one network 324 that would be familiar to those skilled in the art for supporting communications using any of a variety of commercially-available protocols, such as TCP/IP, FTP, UPnP, NFS, and CIFS. The network can be, for example, a LAN, WAN, a virtual private network, the internet, an intranet, an extranet, a public switched telephone network, an infrared network, a wireless network, and any combination thereof. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Services such as web services can communicate using any appropriate type of messaging, such as by using messages in extensible markup language ("XML") format and exchanged using an appropriate protocol such as SOAP (derived from the "Simple Object Access Protocol"). Processes provided or executed by such services can be written in any appropriate language, such as the Web Services Description Language ("WSDL"). Using a language such as WSDL allows for functionality such as the automated generation of client-side code in various SOAP frameworks.

In embodiments utilizing a web server, the web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python®, or Tool Command Language ("TCL"), as well as combinations thereof. The server(s) may also include database servers, including, without limitation, those commercially available from Oracle®, Microsoft®, Sybase®, and IBM®.

A dataset, database, or data store can include several separate data tables, databases, or other data storage mechanisms and media for storing data relating to a particular aspect. The data store is operable, through logic associated therewith, to receive instructions from a server, and obtain, update, or otherwise process data in response thereto. The environment can include a variety of data stores and other memory and storage media as discussed. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate.

Figure 5:
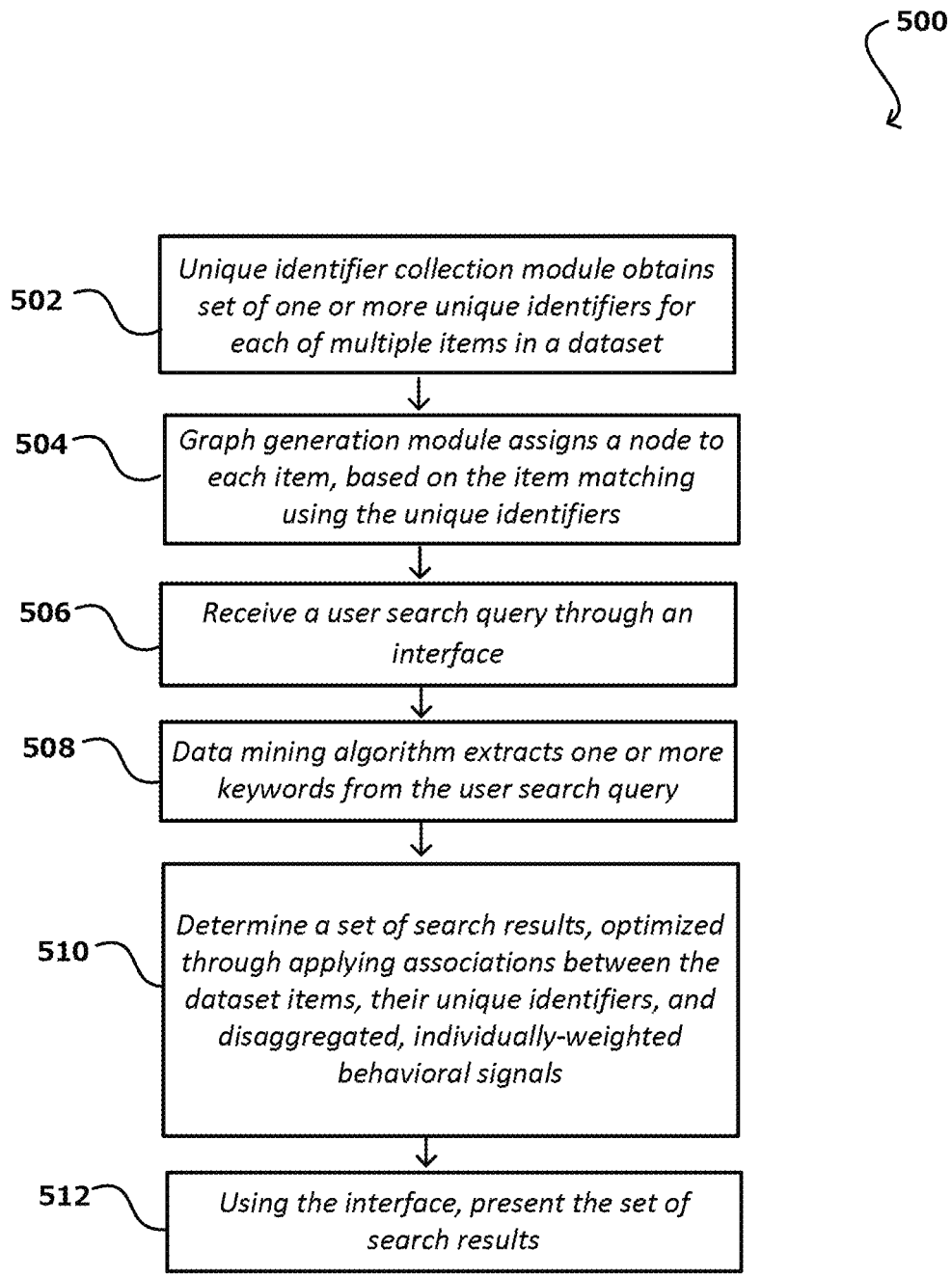
FIG. 5 illustrates an example process flow for aspects of generating query results, in accordance with various embodiments of this disclosure.

FIG. 5 is a flow diagram of an illustrative process 500 for using weighted behavioral signals in connection with determining and providing search results in response to a received query. The process 500 is illustrated as a collection of steps in a logical flow diagram, which represents a sequence of operations that can be implemented in hardware, software, or a combination thereof. In the context of software, the steps 500 represent computer-executable instructions stored on one or more computer-readable storage media that, when executed by one or more processors, perform the recited operations. The order in which operations are described is not intended to be construed as a limitation, and any number of the described steps can be combined in any order and/or in parallel to implement the process. And it will be appreciated that not all of the steps here may be performed in every embodiment. For discussion purposes, the process 500 is described, in part, with reference to some components and features seen in the architecture 300 of FIG. 3.

In various embodiments, at block 502, a unique identifier collection module may obtain a corresponding set of one or more unique identifiers for each of a multiple items in a collection, which can be the subject of a received query. As noted, the unique identifiers may be an ASIN or another collection of characters assigned to a given item in the collection, in order to refer to the item and/or describe an aspect of the item. Again, for the avoidance of doubt, in some embodiments, each of the items may be a tangible or intangible product, or a bundle of such products, and the subject items can be in the form of a service or a bundle of services. Item matching techniques, including those disclosed herein, may then be applied to the collection of identifiers.

At block 504, a graph generation module may assign a corresponding item node to each item, based on the item matching using the unique identifiers. The graph generation module can include the resultant set of item nodes in a graph, such as a bipartite graph. Each unique identifier node may have a node identifier associating the unique identifier node with the unique identifier that the node represents. The generated graph can include unweighted or weighted edges to capture relationships between the set of unique identifier nodes and historical queries and behavioral signals in the search engine and/or data store. In some embodiments, the weighting of an edge may be based on a frequency that a particular unique identifier is assigned to a specific query. A weight assignment module may assign the weights to the edges. The weight of an edge may be numerical value attribute that is taken into consideration by an algorithm, such as a random walk algorithm.

Queries from user computing devices may be received 506 via one or more modules for generating results webpage(s) or interfaces, and, in but one example, such modules include HTML® and various dynamic scripts formatted for rendering on the computing devices. The dynamic scripts enable additional requests for information to populate an HTML® formatted page upon rendering on the computing devices, for instance. In addition, a query monitor can be configured to determine if a new query has been received. In various illustrative embodiments, the received query is in natural language. It should be reiterated that any sending entity (any person, electronic device, internet-based service, etc.) can initiate the search query.

As part of processing after receiving a search query, a data mining algorithm may extract 508 one or more keywords from the text of the query. The keywords extracted may be individual keywords or terms that are formed by multiple keywords. The data mining algorithm may use linguistic processors, such as part-of-speech taggers, phrase chunking programs, or other natural language processors to obtain keywords from the text.

In response to a received query, one or more backend servers can perform 510 a search, obtain, and rank the most similar or feature-rich search results as discussed herein. For example, when a user inputs a search query for a particular item into the search engine, the search engine may provide one or more items matching, or otherwise deemed relevant or recommended for, the search query. Here, a ranking engine may compute one or more personalized search result recommendations, based on ordered association data for inclusion of one or more personalized items in the search results. A post-processing module can be configured to determine particular information in the result set which should be provided to the user. In various embodiments, the post-processing module may perform the ordering/ranking.

A result set of documents and other information, determined responsive to the received user search query in accordance with the present disclosure, may be compiled and returned 512 from the one or more content data stores. Information about each of the search results within the result set may be returned to a content search module. The search engine may provide, to the querying party, search results including one or more result items using data associated and ranked as discussed herein. The display or other provision of the search results can take any of a myriad of forms and need not be any sort of linear presentation or list of results. Note that, in some embodiments, the search results may be read back to the user through a voice communications device or may be provided to a user's computing device. Delivery of the search results could entail transmission of a text message, tweet, or other communication to a computing device, and how results are provided may change significantly based on configurations by, or on behalf of, the user. A result set relevance update module may be configured to further update the systems and methods herein based on positive or negative feedback of users in response to one or more search result sets.

In summary, the use of analyses, including that which is graph-based, with respect to item identifiers and behavior signals enables the discovery of associations between items, behavioral signals, and queries, thereby providing automated, customized search results or recommendations for consumers. In this way, the consumers benefit by discovering items that are suited to their individual tastes and needs, while a merchant may benefit by receiving recurring business from repeat customers or additional business from new customers.

As should be apparent, any collection of information is within the scope of the present disclosure, although data sets of text documents are discussed herein for convenience. Additional properties of the datasets can enhance utility, no matter the type of dataset. In the case of public or other access-authorized web logs ("blogs"), social media, and social data (for example, Twitter, reddit, and Twitch), the present systems and methods can, additionally or alternatively, associate derived social engagement metrics with the retrieved topics and documents and can determine relevance and popularity of a topic. In contrast to simply capturing general internet data, additional properties found in social media datasets, such as "likes" of posts and "retweets" by users who configure their accounts to be public or otherwise permit access, can be used as part of building and curating valuable data sets for querying. In particular, social media data can assist in categorizing potential relevant audiences and in ranking or grouping search results, particularly in light of a given social media user's purchase history.

In some embodiments, neural network, deep learning, and other machine learning techniques can be applied to train a model used to further hone and optimize delivered search results, including optimization via an adaptive rate defined by mathematical equations. Collected data and metadata will allow the systems and methods herein to "learn" meanings from patterns, histories, trends, tendencies, and the like, in order to automatically offer non-defective search results to the end-user. One or more clustering algorithms can be applied, along with feature vectors and/or word vectors in a machine learning phase when clustering from word embeddings. Phrase embedding, as opposed to the use of single words, is certainly within the scope of the present disclosure.

As is known in the neural network and artificial intelligence arts, a variety of neural network types could be applied, including, but by no means limited to, recurrent, modular, and self-organizing neural networks. The neural network will have an inductive learning rate. Prior to production environment use, a sample or non-production dataset may be employed for training a neural network model. Particularly in such training mode, the machine learning features may constantly improve upon themselves using review or feedback to improve algorithms, to ensure robust functionality. Autoencoders may be used jointly with sequence models. The systems and methods can use a beam search or other algorithm for efficient weightings and rankings, and optimizations in some embodiments are made to a predictive system so that the exploratory searches are refined in real-time. Although graphics processing units ("GPUs") are effective for many deep learning neural network applications, the present systems and methods can be used with GPU-based or central processing unit ("CPU")-based systems.

Various types of electronic devices can be used in accordance with embodiments discussed herein. These devices can include, for example, portable computing devices, notebook computers, laptop computers, tablet computers, mobile phones, personal data assistants, video game consoles, televisions, set top boxes, portable media players, wearable computers (e.g., smart watches, smart glasses, and bracelets), display screens, display-less devices, other types of display-based devices, smart furniture, smart household devices such as speakers, smart transportation devices, and/or smart accessories, among others.

Figure 6:
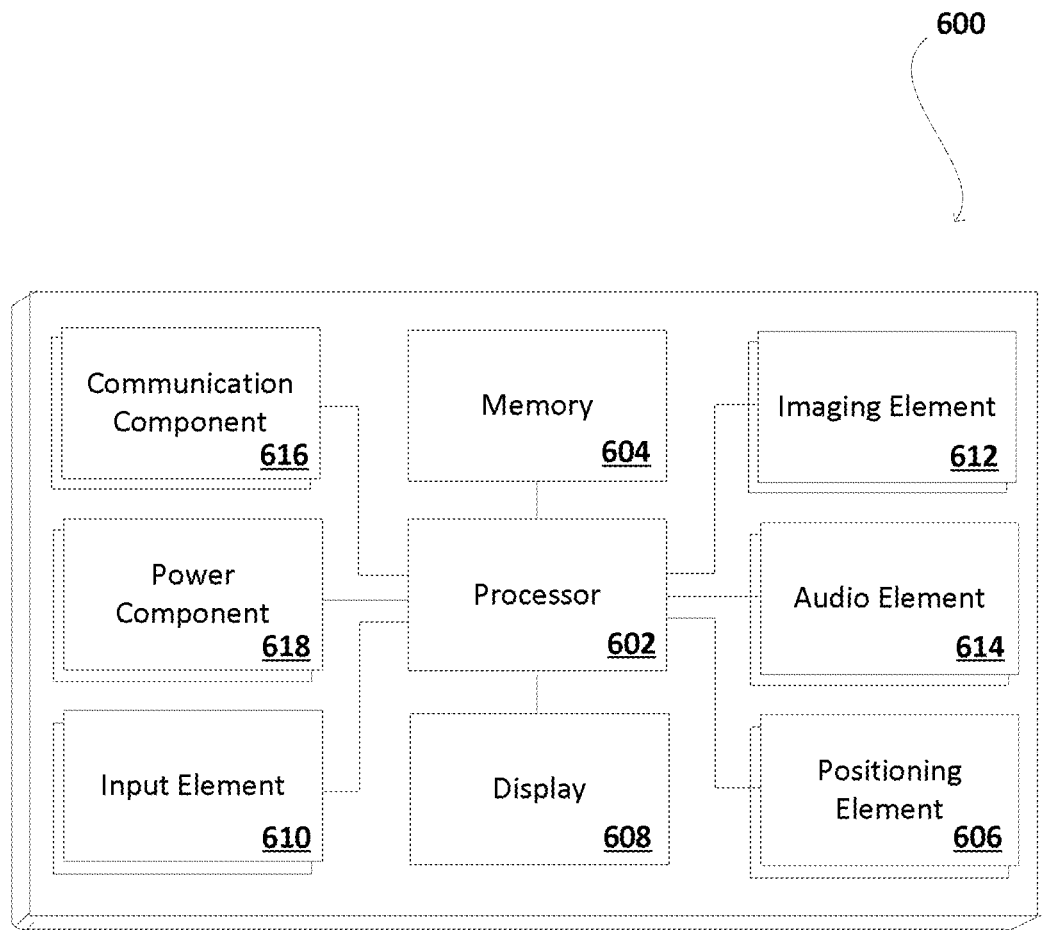
FIG. 6 illustrates example components of a representative computing device which can be utilized in accordance with various embodiments of this disclosure.

FIG. 6 illustrates a logical arrangement of a set of general components of an example computing device 600 that can be used to implement aspects of the various embodiments. In this example, the device includes at least one processor 602 for executing instructions that can be stored in a memory device or element 604. As would be apparent to one of ordinary skill in the art, the device 600 can include many types of memory, data storage, or non-transitory computer-readable storage media, such as a first data storage for program instructions for execution by the processor 602, a separate storage for images or data, a removable memory for sharing information with other devices, etc. The device may include a position element 606 to provide positioning for updated results based on geographic position of the device 600. The device 600 will include some type of display element 608, such as a touch screen or liquid crystal display ("LCD"), although devices such as "smart" speakers and portable media players might convey information via other means, such as through audio speakers. As discussed, the device 600 in many embodiments will include at least one input element 610 that is able to receive conventional input from a user. This conventional input can include, for example, a push button, touch pad, touch screen, wheel, joystick, keyboard, mouse, keypad, or any other such device or element whereby a user can input information and/or commands to the device. In some embodiments, however, such a device might not include any buttons at all, and might be controlled only through a combination of visual and audio commands using imaging element 612 and audio element 614, such that a user can control the device without having to be in contact with the device. In some embodiments, the computing device 600 can include one or more network interface elements 616 for communicating over various networks, such as Wi-Fi, Bluetooth, RF, wired, or wireless communication systems. The device 600 in many embodiments can communicate with a network, such as the internet, using communication component 616, and may be able to communicate with other such devices using this same or a similar component. Components 602-616 may be powered by power component 618 using internal or, in combination with, an external power supply.

Processor(s) 602 may include any suitable processing circuitry capable of controlling operations and functionality of the computing device 600. In some embodiments, the processor(s) 602 may include a central processing unit ("CPU"), a graphic processing unit ("GPU"), one or more microprocessors, a digital signal processor, or any other type of processor, or any combination thereof. In some embodiments, the functionality of the processor(s) 602 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of the processor(s) 602 may include its own local memory, which may store program modules, program data, and/or one or more operating systems.

Storage/memory 604 may include one or more types of storage mediums such as any volatile or non-volatile memory, or any removable or non-removable memory implemented in any suitable manner to store data on the computing device 600. For example, information may be stored using computer-readable instructions, data structures, and/or program modules. Various types of storage/memory may include, but are not limited to, hard drives, solid state drives, flash memory, permanent memory (e.g., read-only memory, "ROM"), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 604 may be implemented as computer-readable storage media ("CRSM"), which may be any available physical media accessible by the processor(s) 602 to execute one or more instructions stored within storage/memory 604. In some embodiments, one or more applications (e.g., gaming, music, video, calendars, lists, etc.) may be run by processor(s) 602 and may be stored in memory 604.

Communications circuitry 616 may include any circuitry allowing or enabling the computing device 600 to communicate with one or more devices, servers, and/or systems. For example, communications circuitry 616 may facilitate communications between a voice communications device and one or more backend servers. Communications circuitry 616 may use any communications protocol, such as any of the previously mentioned exemplary communications protocols.

Where a system includes computerized devices, each such device can include hardware elements that may be electrically coupled via a bus, the elements including, for example, at least one CPU, at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or ROM, as well as removable media devices, memory cards, flash cards, etc.

Such devices also can include a computer-readable storage media reader, a communications device (a modem, a network card (wireless or wired), an infrared communication device, etc.), and working memory as described herein. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices will also include a number of software applications, modules, services, or other elements located within at least one working memory device, including an OS and application programs, such as a client application or internet browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as, but not limited to, volatile and non-volatile, removable and non-removable media implemented in any method or technology for storage of information such as computer readable instructions, data structures, program modules, or other data, including RAM, ROM, EEPROM, flash memory or other memory technology, optical storage (such as CD-ROM and DVD), magnetic storage devices (such as cassettes, tape, disk, or other magnetic storage devices), or any other medium which can be used to store the desired information and which can be accessed by a system device.

Figure 7:
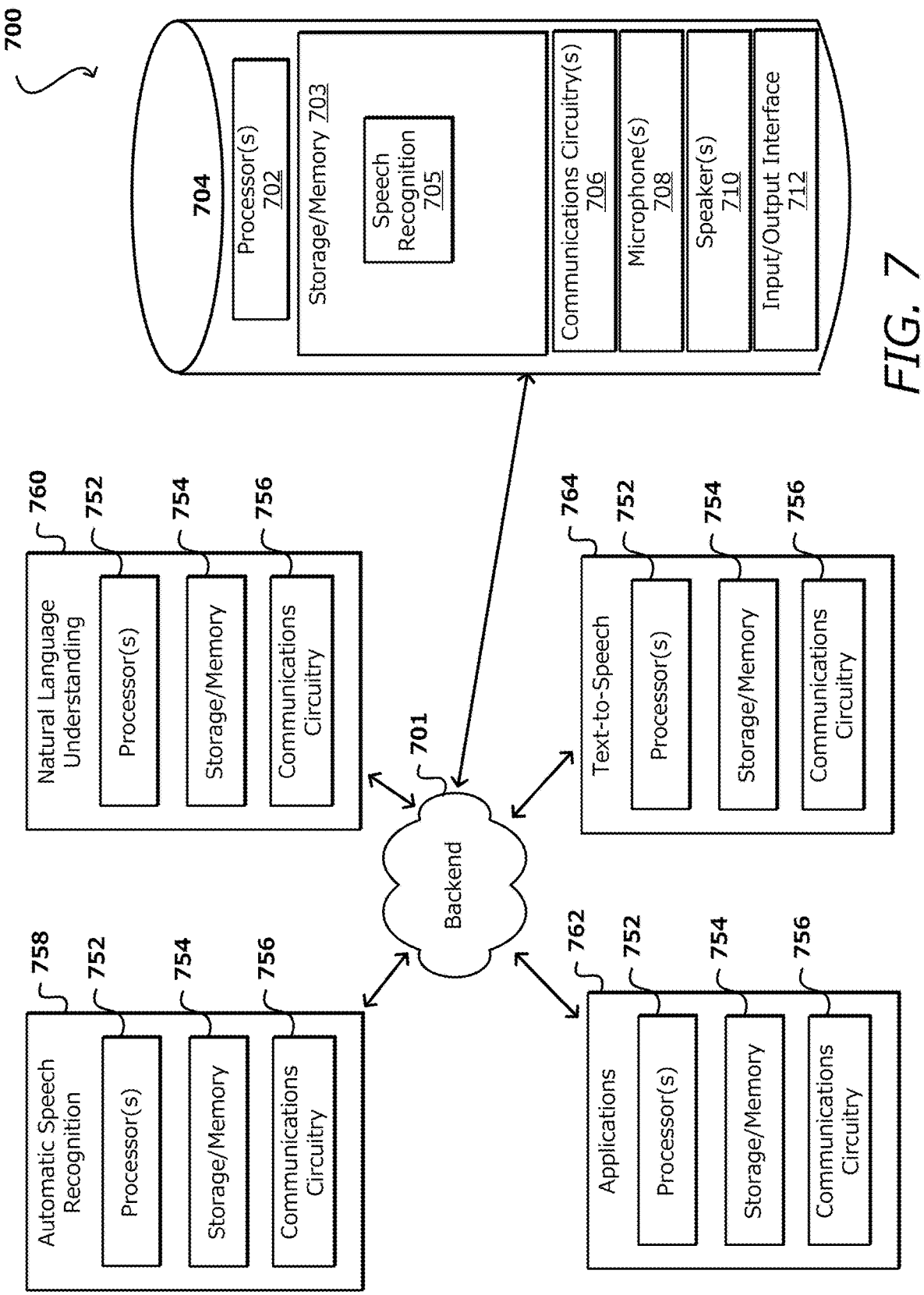
FIG. 7 illustrates an example voice communications device environment in which various embodiments of this disclosure can be implemented.

FIG. 7 illustrates an example search environment 700 for implementing aspects in accordance with various embodiments, specifically where a user interacts with a voice communications device 704 (e.g., Amazon Echo) which, as noted herein, may correspond to any type of electronic device capable of being activated in response to detecting a specific sound. The term voice communications device 704 includes, for example, any device having a microphone or other component configured to generate audio data from sound in the frequency range in which humans communicate. As is known in the art, voice communications devices 704 include devices that utilize a wakeword or other predetermined sound profile to activate some functionality (e.g., send data to a remote device, such as audio input data for speech analysis) as well as button-activated devices that utilize a button (graphical, physical, or both) to enable some audio-related functionality (e.g., a sound-capturing and sending mode).

The voice communications device 704 may, in some embodiments, after detecting a specific sound (e.g., the wakeword), recognize commands (e.g., audio commands and inputs) within captured audio, perform one or more actions in response to the received query and/or command. In some embodiments, voice communications device 704 may be relatively simple or basic in structure such that no mechanical input option(s) (e.g., keyboard, mouse, trackpad) or touch input(s) (e.g., touchscreen, buttons) may be provided. For example, voice communications device 704 may be capable of receiving and outputting audio, and may include power, processing capabilities, storage/memory capabilities, and communication capabilities. Voice communications device 704 may include one or more processors 702, storage/memory 703, communications circuitry 706, one or more microphones 708 or other audio input devices (e.g., transducers), one or more speakers 710 or other audio output devices, and an optional visual input/output ("I/O")

interface 712. However, one or more additional components may be included within voice communications device 704, and/or one or more components may be omitted.

In general, the voice communications device 704 constantly listens for the wakeword and is otherwise inactive. Once the wakeword is recognized, the voice communications device 704 switches from a passive mode to an active mode. It should be noted that the wakeword does not have to be the first word or sound in a given sentence or request. The voice communications device 704 can be configured such that it can record and store a limited amount of audio input data that should, in most instances, be the amount of time needed to speak a sentence or more. Accordingly, even if a wakeword is recognized in the middle or end of a sentence, the voice communications device 704 will have retained the entire sentence which can then be analyzed by one or more backend servers to determine what is being requested.

Voice communications device 704 may also include one or more microphones 708 and/or transducers. Microphone(s) 708 may be any suitable component capable of detecting audio signals. The voice communications device 704 may further include one or more speakers 710. Speaker(s) 710 may correspond to any suitable mechanism for outputting audio signals. In some embodiments, speaker(s) 710 may include headphones or ear buds, which may be wirelessly connected or hard-wired to the voice communications device 704, capable of broadcasting audio. In this manner, the voice communications device 704 may function solely through speech or audio, without the use or need for any input mechanisms or displays.

In response to wakeword detection, the voice communications device 704 may establish a connection with one or more backend servers 701, send audio input data to the backend server 701, and await/receive a response from the backend server 701. In some embodiments, however, non-voice-enabled devices may also communicate with the backend server 701 (e.g., push-to-talk devices).

Persons of ordinary skill in the art will recognize that, in some embodiments, one or more features of the I/O interface 712 may be included in a purely voice-enabled version of the voice communications device 704. For example, one or more LED lights may be included on the voice communications device 704 such that, when microphone(s) 708 receive audio from user 702, the one or more LED lights become illuminated signifying that audio has been received by the voice communications device 704. In some embodiments, the I/O interface 712 may include a display screen and/or touch screen, which may be any size and/or shape and may be located at any portion of the voice communications device 704. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen and include capacitive sensing panels capable of recognizing touch inputs thereon.

One or more backend servers 701, as mentioned previously, may be in communication with the voice communications device 704. Backend server 701 includes various components and modules including, but not limited to, automatic speech recognition ("ASR") module 758 (which may include, for example, speech-to-text ("STT") functionality), natural language understanding ("NLU") module 760, applications module 762, and text-to-speech ("TTS") module 764. In some embodiments, the backend server 701 may also include computer readable media, including, but not limited to, flash memory, RAM, and/or ROM. The backend server 701 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used.

A speech recognition module 705 executing in memory may, for example, include an automatic speech recognition ("ASR") component that recognizes human speech in detected audio. Speech recognition module 705 may also include a natural language understanding ("NLU") component that determines user intent based on the detected audio. Also included within speech recognition module 705 may be a TTS component capable of converting text to speech to be outputted by speaker(s) 710, and/or a STT component capable of converting received audio signals into text to be sent to backend server 701 for processing.

In various embodiments, the contents of the audio input query data may be streamed to one or more backend servers such that at least a portion of the audio input query data can be analyzed and any subsequent portions analyzed immediately upon receipt. In particular, the backend server can begin processing one or more portions of the audio input data prior to the user having completed the instructions. Thus, the backend server(s) can start analyzing whatever portion of the audio input data is received through a variety of techniques, such as ASR and NLU, to convert the audio input data into a series of identifiable words, and then to analyze those words in order to interpret the search request from the user. The backend server(s) can utilize ASR techniques to recognize the spoken words and to translate them into known text for analysis by NLU techniques. Any suitable computer implemented speech-to-text technique may be used to convert the received audio signal(s) into text, such as SOFTSOUND speech processing technologies available from the Autonomy Corporation, which is headquartered in Cambridge, England, United Kingdom. In some embodiments, one or more filters may be applied to the received audio input data to reduce or minimize extraneous noise; however, such is not a requirement.

As an illustrative example, applications module 762 may correspond to a search query application. The search query application of the applications module 762 can be associated with a customer account. The customer account can include at least one profile that can be linked to the search query application in applications module 762. Audio input data can be received at automatic speech recognition module 758 from the voice communications device 704. The automatic speech recognition module 758 can use ASR techniques on the audio input data to generate text data of the audio input data. The natural language understanding module 760 can use NLU techniques on the text data to determine a search query. The application module may include one or more engines and modules of a search service provider and the corresponding functionality described herein. Candidate queries are associated with answers, and one or more answers can be combined, summarized, refined, or otherwise processed to determine responses most relevant to a given user's query. Thereafter, the voice communications device 704 can provide (e.g., speak back to the user) the search results using speaker 710.

TTS module 764 may employ various text-to-speech techniques. It should be noted that techniques for taking text and converting it into audio input data that can represent speech are well known in the art and need not be described in further detail herein, any suitable computer implemented techniques may be used. TTS module 764 may also include processor(s) 752, storage/memory 754, and communications circuitry 756.

Persons of ordinary skill in the art will recognize that although each of ASR module 758, NLU module 760, applications module 762, and TTS module 764 include instances of processor(s) 752, storage/memory 754, and communications circuitry 756, those instances of processor(s) 752, storage/memory 754, and communications circuitry 756 within each of ASR module 758, NLU module 760, applications module 762, and STT/TTS module 764 may differ. For example, the structure, function, and style of processor(s) 752 within ASR module 758 may be substantially similar to the structure, function, and style of processor(s) 752 within NLU module 760; however, the actual processor(s) 752 need not be the same.

Based on the disclosure and teachings provided herein, a person of ordinary skill in the art will appreciate other ways and/or methods to implement the various embodiments. The present specification and drawings are, accordingly, to be regarded in an illustrative, rather than a restrictive, sense. It will be evident that various modifications and changes may be made thereunto without departing from the broader spirit and scope of the invention as set forth in the claims.

What is claimed is:

1. A computer-implemented method, comprising:
   accessing at least one dataset, the dataset including at least one item having at least one unique identifier;
   associating, by a first association graphing, the at least one item with the unique identifier;
   obtaining behavioral signal data regarding the at least one item, the behavioral signal data including at least two signals;
   associating, by a second association graphing, the behavioral signal data with the unique identifier;
   determining, based at least in part on the first association graphing and the second association graphing, an associative model;
   receiving, from a client device, a search query;
   determining, based at least in part on the associative model and a matching of the at least one item to the search query, unranked search query results;
   determining ranked search results, based at least in part on the unranked search query results, the unique identifier, and an individual weighing of each of the at least two signals; and
   providing, for presentation on the client device, the ranked search query results.

2. The computer-implemented method of claim 1, wherein the behavioral signal data including at least one signal in the form of data regarding tracked hyperlink clicks, purchases of the at least one item, additions of the at least one item to an online shopping cart, or consumption or returns of the at least one item.

3. The computer-implemented method of claim 1, wherein the dataset includes content from an e-commerce website.

4. The computer-implemented method of claim 1, wherein the matching of the at least one item to the search query and the determining of the ranked search query results is inferred by at least one neural network trained on a sample collection of data.

5. A computer-implemented method, comprising:
   determining, based at least in part on association graphing, an associative model, the association graphing based at least in part on at least one item appearing in at least one dataset, at least one unique identifier, and behavioral signal data including at least two signals;
   receiving, from a client device, a search query;
   determining, based at least in part on the associative model and a matching of the at least one item to the search query, a first set of search query results;
   determining a second set of search query results, based at least in part on the first set of search query results, the unique identifier, and an individual weighing of each of the at least two signals; and
   providing, for presentation on the client device, the second set of search query results.

6. The computer-implemented method of claim 5, wherein the at least two signals include at least one of hyperlink click data, electronic shopping cart activity data, purchase data, consumption data, or query source data.

7. The computer-implemented method of claim 5, wherein the dataset includes content from an e-commerce website.

8. The computer-implemented method of claim 5, wherein the association model is determined, at least in part, by application of at least one collaborative grouping.

9. The computer-implemented method of claim 5, wherein the association model is determined, at least in part, by application of at least one label propagation algorithm.

10. The computer-implemented method of claim 5, further comprising:
    training a network on a sample dataset; and
    applying the network to optimize determination of the second set of search query results.

11. The computer-implemented method of claim 5, wherein the search query is submitted in natural language and received by a voice communication device.

12. The computer-implemented method of claim 5, wherein the search query is received by an interface which is part of an e-commerce store.

13. A system, comprising:
    at least one processor; and
    a memory device including instructions that, when executed by the at least one processor, cause the system to:
    determine, based at least in part on association graphing, an associative model, the association graphing based at least in part on at least one item appearing in at least one dataset, at least one unique identifier, and behavioral signal data including at least two signals;
    receive, from a client device, a search query;
    determine, based at least in part on the associative model and a matching of the at least one item to the search query, a first set of search query results;
    determine a second set of search query results, based at least in part on the first set of search query results, the unique identifier, and an individual weighing of each of the at least two signals; and
    provide, for presentation on the client device, the second set of search query results.

14. The system of claim 13, wherein the at least two signals include at least one of hyperlink click data, electronic shopping cart activity data, purchase data, consumption data, or query source data.

15. The system of claim 13, wherein the dataset includes content from an e-commerce website.

16. The system of claim 13, wherein the association model is determined, at least in part, by application of at least one collaborative grouping.

17. The system of claim 13, wherein the association model is determined, at least in part, by application of at least one label propagation algorithm.

18. The system of claim 13, wherein instructions, when executed by the at least one processor, further cause the system to:
   train a network on a sample dataset; and
   apply the network to optimize determination of the second set of search query results.

19. The system of claim 13, wherein the search query is submitted in natural language and received by a voice communication device.

20. The system of claim 13, wherein the search query is received by an interface which is part of an e-commerce store.

* * * * *